United States Patent

[11] 3,559,660

| [72] | Inventor | Carl L. Rollins<br>Tulsa, Okla. |
|---|---|---|
| [21] | Appl. No. | 755,893 |
| [22] | Filed | Aug. 28, 1968 |
| [45] | Patented | Feb. 2, 1971 |
| [73] | Assignee | Warren Petroleum Corporation<br>Tulsa, Okla.<br>a corporation of Delaware. |

[54] PIPE INSULATION AND METHOD OF MAKING SAME
3 Claims, 2 Drawing Figs.

| [52] | U.S. Cl. | 138/149, 138/112 |
|---|---|---|
| [51] | Int. Cl. | F16l 59/12 |
| [50] | Field of Search | 138/113, 111(Cursory), 114, 149, 112; 285/47 |

[56] References Cited
UNITED STATES PATENTS

| 2,347,855 | 5/1944 | Varga | 138/151X |
|---|---|---|---|
| 2,551,710 | 5/1951 | Slaughter | 138/113X |
| 3,307,590 | 3/1967 | Carlson | 138/113X |

Primary Examiner—Laverne D. Geiger
Assistant Examiner—Richard J. Sher
Attorneys—Meyer Neishloss, Deane E. Keith and Paul L. Tillson ABSTRACT: A method and apparatus for insulating pipes in which annular spacers are secured to the pipe along its length. Sheet metal covers encircling the pipe are secured to the spacers and supported by the spacers at the distance required for insulation of the desired thickness. Liquids capable of reacting rapidly to form a solid foam of excellent insulating characteristics are injected into the annular space between the pipe and the sheet metal cover to fill that space with the foam insulation material.

PATENTED FEB 2 1971  3,559,660

INVENTOR.
CARL L. ROLLINS

PIPE INSULATION AND METHOD OF MAKING SAME

This invention relates to the insulation of pipes and more particularly to an improved method and structure for insulating pipes in the field.

Customarily pipes are insulated in the field by securing rigid elongated sections of molded asbestos or other material to the pipe. The sections of insulation are semicircular arcs in cross section to allow two of the sections to be held together by wire or metallic bands to encircle the pipe. Frequently the insulation is then covered with cloth and a suitable plasterlike coating material to protect the insulation from moisture.

Insulation installed by the method described above is fragile and easily damaged. The preformed sections have a low density and little strength. The plasterlike coating material adds little to the strength of the insulation.

An important disadvantage of prior methods of insulating pipe is the high cost of such methods. Contributing to the high cost is the low strength of the molded or preformed sections. Many of the sections become damaged during transportation to the job site. Moreover, the low density of the preformed sections increases the cost of transportation because of the large volume of the materials that must be transported to the job site. Finally, the plasterlike coating is time-consuming work performed by highly paid workmen.

This invention resides in a method and apparatus for insulating pipe in which spacers having an inside diameter equal to the outside diameter of the pipe to be insulated are secured around the pipe at intervals along the length of the pipe. The spacers have an outside diameter adapted to provide an insulation of the desired thickness. Metal sheet is supported and held in position around the pipe by the spacers. Both the longitudinal and transverse joints of the sheet metal are sealed with tape to prevent leakage. Liquids which react rapidly to form and liberate gas that results in a solid foam are injected into the space between the outer surface of the pipe and the sheet metal. In a preferred embodiment, the spacer has sufficient rigidity to support the pipe from hangers or other pipe supports and yet has a low heat transfer capacity.

Figure 1:
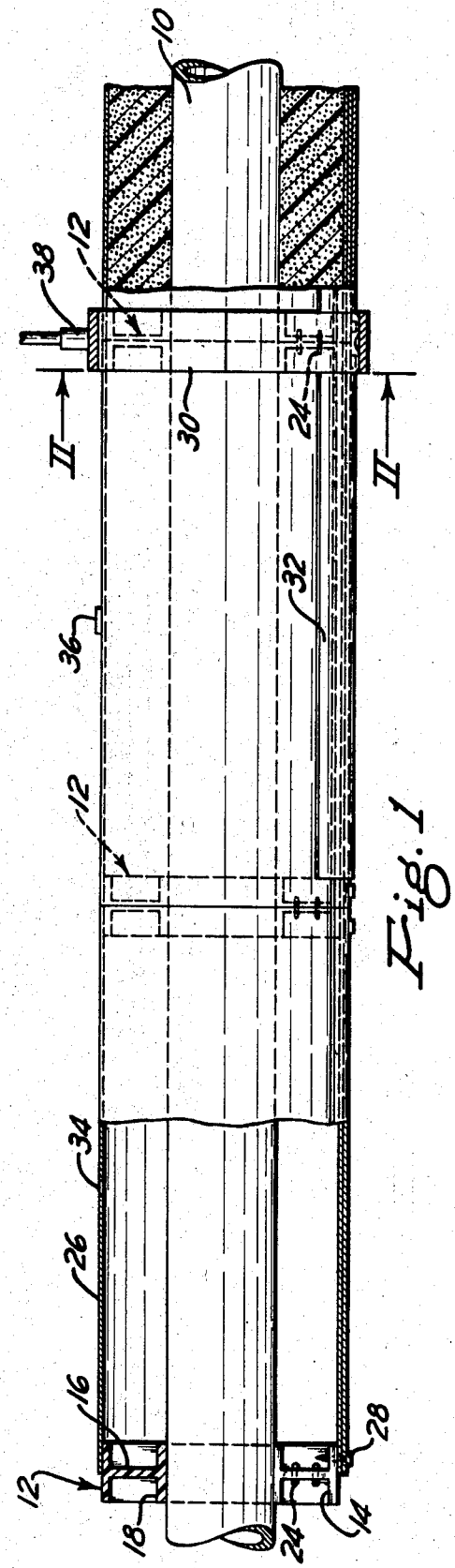
FIG. 1 is a longitudinal view partially in section and partially in elevation showing a pipe insulated in accordance with this invention.
Figure 2:
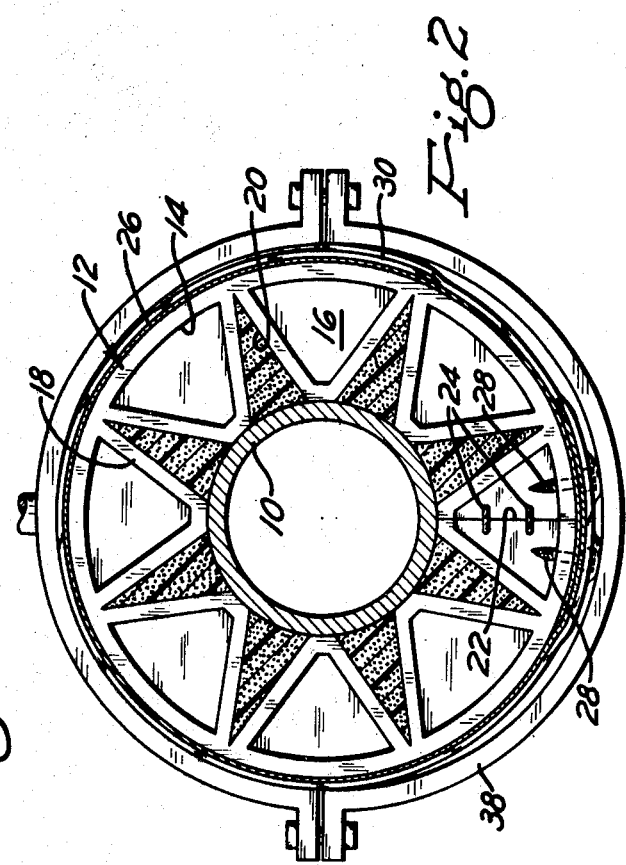
FIG. 2 is a transverse section along section line II—II in FIG. 1 showing the spacer structure in elevation.

Referring to FIG. 1 of the drawing, the pipe 10 to be insulated is shown with a plurality of spacers 12 in place at intervals along the length of the pipe. Referring to FIG. 2, spacer 12 is shown having an outer rim 14 of a diameter adapted to provide an insulation of the desired thickness surrounding pipe 10. Extending inwardly from the outer rim 14 is a plurality of substantially sectorial webs 16. Each of the webs has a flange 18 of the same width as rim 14 along its periphery to increase the strength and rigidity of the spacer. The web 16 extends inwardly from the rim 14 a distance such that in combination with the flanges 18 they define an inner diameter for the spacer equal to the outside diameter of pipe 10. Sectorial webs 16 taper inwardly more sharply than the radius of the web to provide spaces 20 between the webs. Spacers 12 are preferably made of a plastic material such as polyethylene or polystyrene in a molding operation to provide a monolithic structure.

A radial cut 22 is made through each of spacers 12 as shown at the bottom in FIG. 2 to allow the spacer to be slipped over the pipe after the pipe is in place. The free ends at the radial cut 22 are easily pulled apart as a result of the openings between the webs 16 to allow the spacer to be slipped over the pipe. As shown in FIG. 1, the free ends of the web 16 are held together by staples 24 after the web is in place on the pipe. For convenience in illustration, the staples 24 are shown extending through the web, but the staples can be inserted through the rim 14, if desired.

After the spacers are in place at the desired intervals along pipe 10, sheet metal 26, which may be aluminum, stainless steel or galvanized steel, is wrapped around the spacers. The ends of the sheet metal cover 26 overlap and are secured to the spacer by screws 28, as shown in FIG. 2 of the drawing. The transverse seams where adjacent pieces of sheet metal abut are then covered by tape 30 to close openings through which the foam-forming liquid might leak. The outer free end of the sheet metal is covered between the spacers by a strip of tape 32 for the same purpose.

After the sheet metal cover is in place, hole 34 is punched in the upper part of the cover, and the foam-forming materials are sprayed into the space between the pipe 10 and the cover 26. Foam-forming materials readily available as commercial products usually consist of two liquids, one of which contains a catalyst. Upon mixing the liquids, a rapid exothermic reaction occurs to liberate gas and cause setting of a resin to form a rigid foam. Suitable foam-forming materials are urethane foam-forming materials sold by PPG and by Mine Safety Appliances Co. Other suitable for foam-forming materials are epoxy compositions and curing agents described, for example, in U.S. Pat. No. 3,051,665 of Wismer et al. The particular foam-forming composition used will depend upon the type of service in which the pipe line is used, and particularly on the temperature of the fluids flowing through the pipe line. After injection of the foam-forming material, a plug 36 is inserted in the opening 34.

The rigid spacers provide means for supporting the pipe without impairing the insulation. The spacers have sufficient rigidity to support the pipe from a hanger 38 extending around the cover 26 at the spacer, as shown in FIG. 1. Similarly, the pipeline can be bottom supported by cradles in alignment with the spacers.

This invention provides insulation which will greatly reduce the flow of heat to or from the pipe to the surrounding atmosphere. The foam insulation has a very low thermal conductivity. By injecting the foam in the form of liquids which react within the annular space to be filled, complete filling of the space between the pipe and the sheet metal cover is obtained. The plastics used in the spacers have a low coefficient of thermal conductivity. Additionally, the thinness of the web further reduces the capacity of the spacers to transfer heat between the sheet metal cover and the pipe, and that capacity is still further reduced by the openings between adjacent webs. Those openings become filled with the foam insulation during the step of injecting foam-forming liquids into the space between the pipe and sheet metal cover. Finally, the sheet metal cover provides a radiation shield to reduce the transfer of heat by radiation.

I claim:

1. Pipe insulation comprising plastic annular spacers secured at intervals along the length of pipe; said spacers comprising a heavy outer rim of substantial width, thin substantially sectorial webs extending inwardly from the outer rim a distance adapted to engage the outer surface of the pipe, said webs being spaced from adjacent webs to provide openings through the spacers when the spacers are in position on the pipe, flanges at the edges of the sectorial webs having substantially the same width as the outer rim, a radial cut extending through the rim and continuing at least to the center to permit installation of the spacers around the pipe; connecting means extending across the cut to hold the free ends of the spacers together and the spacers in place on the pipe; sheet metal wrapped around the spacers and secured thereto to form a cylindrical cover surrounding and spaced from the pipe; and foam insulation formed in situ filling the space between the pipe and the sheet metal cover.

2. Insulation as set forth in claim 1 in which the radial cut extends through the outer rim and a web, and the connecting means are staples extending through the web and spanning the cut.

3. Apparatus as set forth in claim 1, in which securing means extend through the cover and the rim to hold the cover in place on the spacers.